US010512206B2

(12) United States Patent
Marchesan

(10) Patent No.: US 10,512,206 B2
(45) Date of Patent: Dec. 24, 2019

(54) AGRICULTURAL TILTING BEARING ASSEMBLY AND IMPROVED SUPPORT BRACKET FOR CONNECTING THE SAME TO AGRICULTURAL EQUIPMENT

(71) Applicant: Marchesan Implementos E Maquinas Agricolas Tatu S.A., Matao-SP (BR)

(72) Inventor: Jose Luiz Alberto Marchesan, Matao (BR)

(73) Assignee: Marchesan Implementos e Maquinas Agricolas Tatu S.A., Matao-SP (BR)

(*) Notice: Subject to any disclaimer, the term of this patent is extended or adjusted under 35 U.S.C. 154(b) by 77 days.

(21) Appl. No.: 15/944,477

(22) Filed: Apr. 3, 2018

(65) Prior Publication Data

US 2019/0174665 A1 Jun. 13, 2019

Related U.S. Application Data

(63) Continuation of application No. 15/837,593, filed on Dec. 11, 2017, now abandoned.

(51) Int. Cl.
*A01B 71/04* (2006.01)
*A01B 76/00* (2006.01)
(Continued)

(52) U.S. Cl.
CPC .............. *A01B 76/00* (2013.01); *A01B 71/04* (2013.01); *F16C 11/02* (2013.01); *F16C 19/364* (2013.01);
(Continued)

(58) Field of Classification Search
CPC ......... A01B 23/06; A01B 71/04; A01B 76/00; F16C 2310/00
See application file for complete search history.

(56) References Cited

U.S. PATENT DOCUMENTS 1,726,278 A * 8/1929 Strandlund ............ A01B 23/06
172/168
2,097,244 A 10/1937 Sjogren et al.
(Continued)

FOREIGN PATENT DOCUMENTS

BR MU 8203301-3 U2 11/2003
BR MU 8402968-4 U 5/2005
(Continued)

*Primary Examiner* — Bradley Duckworth
(74) *Attorney, Agent, or Firm* — Alston & Bird LLP

(57) ABSTRACT

An improved tilting bearing assembly (100) is provided that includes a support bracket and a tilting bearing; the support bracket and the tilting bearing, along with methods of replacing the same are also provided. The support bracket generally comprises a substantially planar upper portion lying in a first plane and having two opposing ends and a pair of elongated openings, each elongated opening extending in a first direction entirely through the upper portion of the support and having a closed end and an opposing open end, the closed end of each elongated opening being equidistant from respective ones of the two opposing ends; and two opposing leg portions, each leg portion projecting at an angle relative to the first plane, extending at respective upper ends of each leg portion from one of the two opposing ends of the upper portion and terminating at respective lower ends of each leg portion.

5 Claims, 8 Drawing Sheets

(51) Int. Cl.
*F16C 33/78* (2006.01)
*F16C 35/06* (2006.01)
*F16M 13/02* (2006.01)
*F16C 19/36* (2006.01)
*F16C 33/66* (2006.01)
*F16C 11/02* (2006.01)
*F16C 19/54* (2006.01)

(52) U.S. Cl.
CPC ............ *F16C 19/54* (2013.01); *F16C 33/664* (2013.01); *F16C 33/7813* (2013.01); *F16C 35/06* (2013.01); *F16M 13/02* (2013.01); *F16C 33/66* (2013.01); *F16C 2310/00* (2013.01)

(56) References Cited

U.S. PATENT DOCUMENTS

| | | | |
|---|---|---|---|
| 2,580,508 A | 1/1952 | Birdwell | |
| 2,597,524 A | 5/1952 | Birt | |
| 2,725,812 A | 12/1955 | Frank | |
| 2,729,043 A * | 1/1956 | Frank | A01B 23/06 172/599 |
| 2,732,266 A * | 1/1956 | Robertson | A01B 23/06 384/157 |
| 2,771,326 A | 11/1956 | Smith et al. | |
| 2,833,599 A * | 5/1958 | Padrick | A01B 21/086 384/157 |
| 2,877,064 A * | 3/1959 | Oehler | A01B 23/06 384/157 |
| 3,098,680 A * | 7/1963 | Lohman | A01B 15/18 384/157 |
| 3,265,344 A | 8/1966 | Reuben | |
| 3,576,216 A * | 4/1971 | Tanke | A01B 23/06 172/570 |
| 4,173,262 A * | 11/1979 | Adee | A01B 71/04 172/599 |
| 4,249,782 A | 2/1981 | Frank | |
| 5,267,619 A | 12/1993 | Eversole | |
| 5,320,307 A | 6/1994 | Spofford et al. | |
| 5,397,187 A | 3/1995 | Cachinero et al. | |
| 5,678,930 A | 10/1997 | Kreftmeyer et al. | |
| 5,873,547 A | 2/1999 | Dunstan | |
| 5,979,846 A | 11/1999 | Fluhr | |
| 6,682,015 B2 | 1/2004 | Levert et al. | |
| 8,152,094 B2 | 4/2012 | Foster | |
| D661,713 S | 6/2012 | Marchesan | |
| 8,397,187 B2 | 3/2013 | Sawada | |
| 8,721,185 B2 | 5/2014 | Marchesan | |
| 9,157,475 B2 | 10/2015 | Gutowski et al. | |
| 9,249,834 B2 | 2/2016 | Cross et al. | |
| 9,769,974 B2 * | 9/2017 | Cross | A01B 61/046 |
| 2005/0178936 A1 | 8/2005 | Chen | |

FOREIGN PATENT DOCUMENTS

| | | |
|---|---|---|
| BR | D17004439-2 F | 12/2011 |
| BR | D17004440-6 F | 12/2011 |
| BR | MU 9001952-0 U2 | 1/2012 |

* cited by examiner

AGRICULTURAL TILTING BEARING ASSEMBLY AND IMPROVED SUPPORT BRACKET FOR CONNECTING THE SAME TO AGRICULTURAL EQUIPMENT

CROSS-REFERENCE TO RELATED APPLICATIONS

This application is a continuation of U.S. application Ser. No. 15/837,593, filed Dec. 11, 2017, the contents of which as are incorporated by reference herein in their entirety.

BACKGROUND

Related Field

The subject matter of the present invention relates to agricultural tilting bearings used in a variety of agricultural pieces of equipment, including equipment used for soil preparation (e.g., disk harrows), plant growing such as sugarcane (e.g., cultivators), and for soil conservation (e.g., levee plows). These types of agricultural equipment typically include a revolving arrangement of active bodies (e.g., gangs or sets of concave discs) as part of their structure. The active bodies may be spaced at regular intervals and mounted on a common axle, such that the revolving arrangement of the active bodies is configured to directly work at cutting and/or tilling of soil. The active bodies (e.g., gangs or sets of concave discs) are secured relative to one another and the remaining structure of the agricultural equipment via a combination of bearing structures and support components.

Related Art

Agricultural pieces of equipment of different models, especially those aimed at preparing the soil, such as levelling harrows, disc harrows, terracing plows and the like, constitute a class of pieces of equipment which bear high loads and operate under several field conditions, which results in intense forces in multiple directions, radial and axial. The use of agricultural tilting bearings, such as that described in Brazilian Application MU8402968-4, due to the form of assembling them in the structure of the equipment, enables absorption of some degree of the imposed forces. This occurs, at least in part, because of the manner in which agricultural tilting bearings provide a natural resilience along the common axle upon which the active bodies (e.g., gangs or sets of concave discs) are mounted during use. Specifically, the tilting characteristics of these types of bearings allow the active bodies to rotate more freely, with less friction, thereby providing an enhanced durability of the bearing's internal components.

Conventional agricultural tilting bearings are generally constructed with specific structural characteristics, making them applicable only for utilization with a particular type of equipment and sometimes only with a specific manufacturer's version of that type of equipment. In certain applications reduced component life has also been observed. Interchangeability is additionally not conveniently provided via conventional configurations. Applicant's own U.S. Pat. No. 8,721,185 ("the '185 patent") admittedly provides some degree of flexibility for interchangeability; however, due to the complexities involved with the specific structural characteristics incorporated within conventional agricultural tilting bearings and even that of the bearing of the '185 patent, their replacement is oftentimes time-consuming and labor intensive. Thus, an improved agricultural tilting bearing that provides improved component life and a simplistic interchangeable design is desirable.

BRIEF SUMMARY

Various embodiments of the present invention are directed toward an improved tilting bearing assembly (100) comprising a support bracket and a tilting bearing. The support bracket comprises: a substantially planar upper portion lying in a first plane and having two opposing ends and a pair of elongated openings, each elongated opening extending in a first direction entirely through the upper portion of the support and having a closed end and an opposing open end, the closed end of each elongated opening being equidistant from respective ones of the two opposing ends; and two opposing leg portions, each leg portion projecting at an angle relative to the first plane, extending at respective upper ends of each leg portion from one of the two opposing ends of the upper portion and terminating at respective lower ends of each leg portion, wherein: the closed end of each of the elongated openings is offset an equal distance from a respective one of the two opposing ends of the upper portion; the open end of each of the elongated opening intersects and is defined, in part, by a respective one of the two opposing ends of the upper portion; an aperture is defined in each of the leg portions between the lower ends of each of the leg portions and the upper portion of the support bracket; at least a portion of the aperture intersects and, in part, defines the open end of a respective one of the pair of elongated openings; a pair of holes is defined in each of the respective lower ends of each leg portion; and each lower end of each leg portion defines a substantially U-shaped channel that extends intermediate each of the pair of holes. The tilting bearing comprises: an inner flange and an opposing outer flange; a housing positioned intermediate, along a longitudinal axis of the tilting bearing, the inner and outer flanges; a pair of tapered roller bearings flanking, along the longitudinal axis, the housing; and a pair of face-to-face seals, each positioned intermediate, along the longitudinal axis, the housing and a respective one of the inner or the outer flange, wherein: the housing has two opposing trunnions, each extending in a direction perpendicular to the longitudinal axis, and at least a portion of each of the two opposing trunnions is received in the substantially U-Shaped channel of a respective one of each leg portion of the support bracket.

Various embodiments of the present invention are directed toward an improved tilting bearing for use with an associated piece of agricultural equipment. The improved tilting bearing comprises: an inner flange and an opposing outer flange; a housing positioned intermediate, along a longitudinal axis of the tilting bearing, the inner and outer flanges; a pair of tapered roller bearings flanking, along the longitudinal axis, the housing; and a pair of face-to-face seals, each positioned intermediate, along the longitudinal axis, the housing and a respective one of the inner or the outer flange, wherein: the housing has two opposing trunnions, each extending in a direction perpendicular to the longitudinal axis; and at least a portion of each of the two opposing trunnions is configured to be received in a substantially U-Shaped channel of a respective one of each leg portion of an associated support bracket.

Various embodiments of the present invention are directed toward an improved support bracket configured to affix an improved tilting bearing to a portion of an associated piece of agricultural equipment. The improved support bracket comprises: a substantially planar upper portion lying in a first plane and having two opposing ends and a pair of elongated openings, each elongated opening extending in a first direction entirely through the upper portion of the support and having a closed end and an opposing open end, the closed end of each elongated opening being equidistant from respective ones of the two opposing ends; and two opposing leg portions, each leg portion projecting at an angle relative to the first plane, extending at respective upper ends of each leg portion from one of the two opposing ends of the upper portion and terminating at respective lower ends of each leg portion, wherein: the closed end of each of the elongated openings is offset an equal distance from a respective one of the two opposing ends of the upper portion; the open end of each of the elongated opening intersects and is defined, in part, by a respective one of the two opposing ends of the upper portion; an aperture is defined in each of the leg portions between the lower ends of each of the leg portions and the upper portion of the support bracket; and at least a portion of the aperture intersects and, in part, defines the open end of a respective one of the pair of elongated openings.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION OF VARIOUS EMBODIMENTS

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Assembly Overview

Figure 1A:
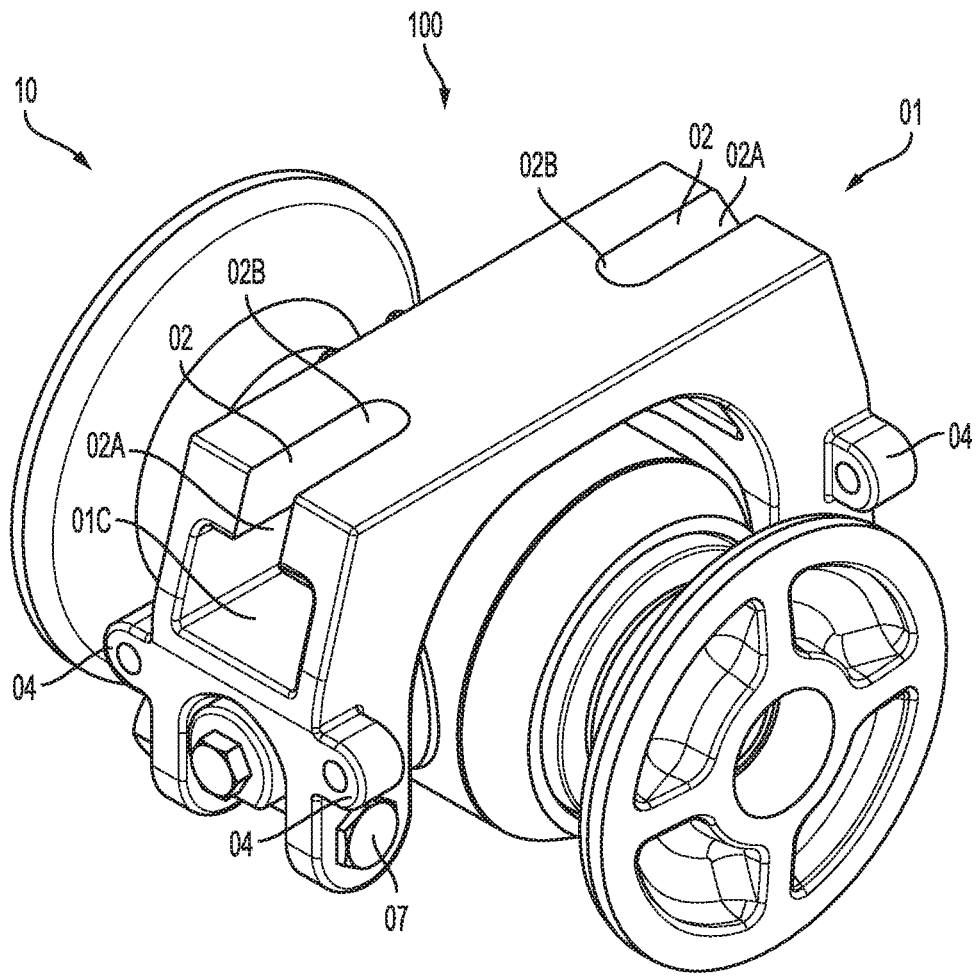
FIG. 1A is a top perspective view of an improved tilting bearing assembly equipped with an improved support bracket and an improved tilting bearing according to various embodiments of the present invention.
Figure 1B:
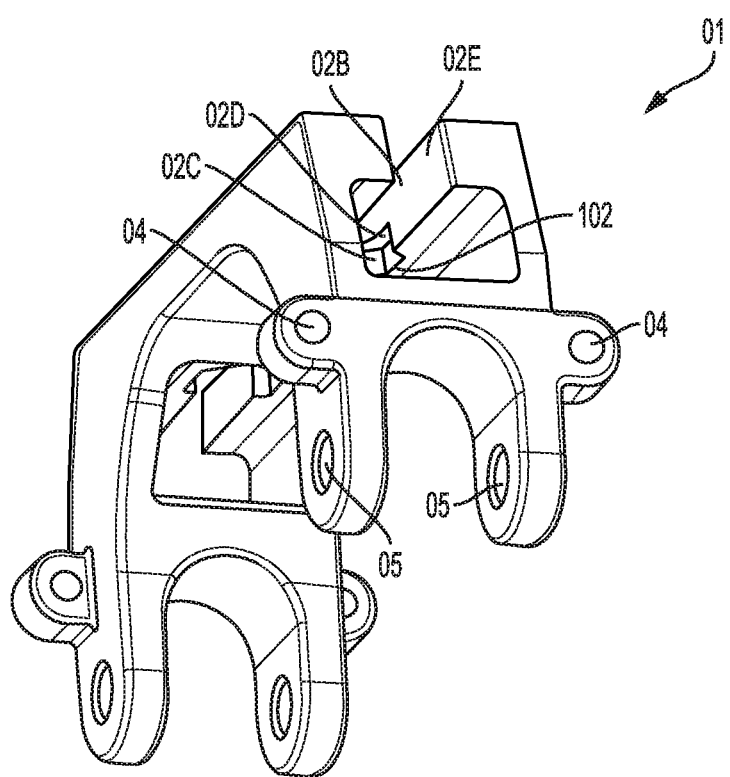
FIG. 1B is a bottom perspective view of the improved support bracket of FIG. 1A.

With reference to FIGS. 1A-B, it may be understood that various embodiments of the present invention provide an improved tilting bearing assembly (100) comprising an improved tilting bearing (10) and an improved support bracket (01). The improved tilting bearing (10) incorporates a combination of uniquely positioned sealing elements (e.g., face-to-face rings), load-absorbing elements (e.g., tapered roller bearings), and trunnions (e.g., cylindrical protrusions used as a flexible mounting or pivoting point). The resulting configuration is an improved tilting bearing (10) exhibiting characteristics supportive of high loads, providing improved lubricant retention, and enhancing resilience of the bearing for the absorption and dissipation of frequent bending moments of an axle of, for example, disc gangs of a piece of agricultural equipment to which the improved tilting bearing assembly (100) may be mounted.

Figure 6:
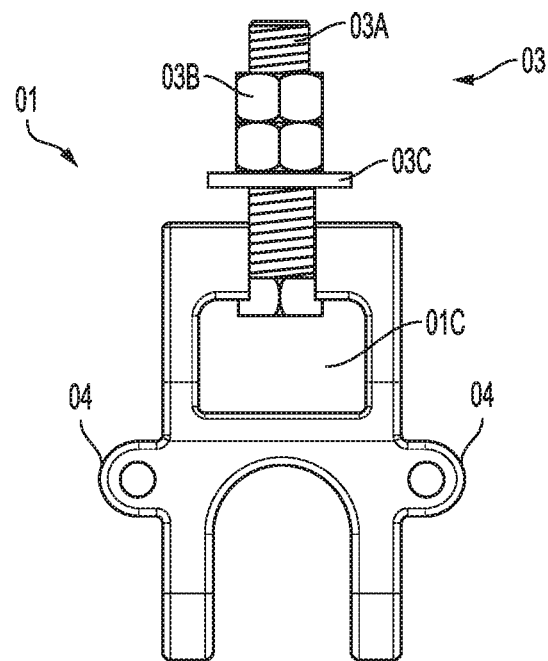
FIG. 6 is another front elevation view of the improved support bracket of FIG. 2 according to various embodiments of the present invention, illustrating further a fastener extending through a portion of an elongate open-ended passage of the improved support bracket, with a portion of the fastener being retained within the recessed portion adjoining the passage.
Figure 7:
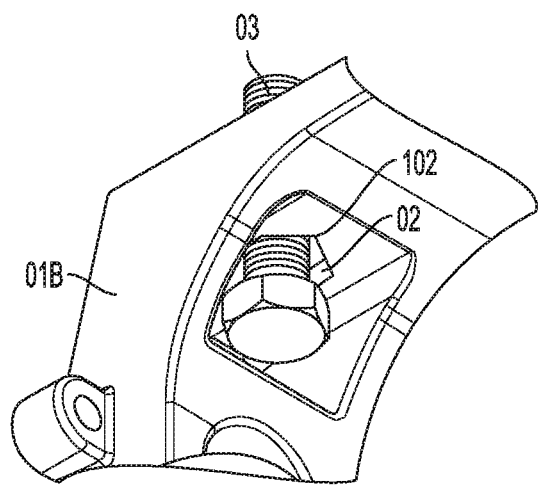
FIG. 7 is a bottom perspective view of the improved support bracket of FIG. 2 according to various embodiments of the present invention, illustrating once more the fastener shown also in FIG. 6.

The improved support bracket (01) provides an unique structure, whereby the support bracket and the improved tilting bearing (10), to which the support bracket is attached, may both be quickly and easily removed from the agricultural equipment to which they may both be mounted (see FIGS. 1, 6, & 7 in combination, with elongate open-ended passages (02) through which a fastener assembly (03) may be extended). Notably, due at least in part to the open-ended nature of the passage, the fastener assembly (03) may be quickly removed from the "slots" without having to wholly disassemble the fastener assembly, as would be necessary—for example—in conventional closed-ended slot configurations. Still further, the elongate open-ended passages (02) coincide with and adjoin respective recesses or recessed portions (102) that are semi-hexagonal in shape and define a ledge or shelf relative to the passages, thereby permitting retention of the fastener assembly (03) against the ledge or shelf and relative to the closed-end of the passages (02) in a simplistic manner (e.g., without the need for square washers and/or lock washers for retention, as in conventional configurations).

Connectivity between the improved tilting bearing (10) and the improved support bracket (01) occurs via a series of openings (05) with recesses (06) defined therein. In at least one embodiment, the openings (05) are counterbored, thus defining the recesses (06). These openings and recesses (05, 06) are sized and configured to receive therethrough a fastener assembly (07). The recesses (06) may, in certain embodiments, be sized and/or shaped to correspond with a shape of at least a portion of the fastener assembly (07), so as to secure the same in a non-rotatable manner. In various embodiments, the fastener assembly (07) comprises a bolt, a spring washer, and a nut, whereby the recesses (06) are sized and/or shaped to non-rotatably retain a head of the bolt. In one embodiment, the fastener assembly (07) comprises a ⅝"×3½" bolt and a ⅝" nut; it should be understood, though, that these specific dimensional sizes are exemplary and non-limiting in nature relative to the inventive concepts described herein. All that is necessary is for the improved support bracket (01) and the improved tilting bearing (10) to be connectively secured relative to one another.

The resulting improved tilting bearing assembly (100) thus provides high operational performance and greater durability, combined with a reduction of operational and repositioning costs.

Support Bracket

Turning now with particularity to FIGS. 1A-B and 2-5, illustrated therein is an improved support bracket (01) according to various embodiments of the present invention. It may be seen that the support bracket (01) exhibits symmetry about a vertical midpoint plane of symmetry (not illustrated, but see FIG. 3 for purposes of reference). This degree of symmetry carries through to symmetric characteristics of components or features of the bracket that exist in pairs, including the passages (02), the recesses (102), hollow ears (04), and openings (05), by way of non-limiting examples. Each of these and additional features will be detailed further below.

The improved support bracket (01) includes an upper surface (01A) (i.e., a substantially planar upper surface) that tapers (in certain embodiments seamlessly) into two opposing leg portions (01B) (i.e., fastening sides). Provided on the upper surface (01A) are two elongate open-ended passages (02), which in certain embodiments may oppose one another and be equidistant from respective opposing ends of the upper surface (01A). An opening (01C) is also provided along each of the two opposing leg portions (01B) according to various embodiments, thereby defining two opposing window-like apertures that are each, in part, connected to a portion of a respective one of the two elongate open-ended passages (02).

A pair of hollow ears (04) are also provided along and protrude relative to each of the two opposing leg portions (01B). The pair of hollow ears (04) are positioned below the opening (01C) of each leg portion (01B), so as to not obstruct the opening and/or any portion of the elongate open-ended passage (02) to which the opening is connected. A lower end of each of the two opposing leg portions (01B) is further, in certain embodiments, defined by a pair of openings (05) that flank a U-shaped channel (01D). Each of the pair of hollow ears (04) and the pair of openings (05) are respectively, as distinct sets, oriented perpendicular relative to one another, as may be best understood with reference to FIGS. 1B and 2.

As mentioned, provided on the upper surface (01A) of the support (01) are two elongate open-ended passages (02). In at least the illustrated embodiment the passages (02) each have an open end (02A) and an opposing closed end (02B), which may be understood in each of FIGS. 1A-B, 2 and 10A-B. The open end (02A) of each passage (02) interacts with or otherwise intersects a respective one of the openings (01C) of the two opposing leg portions (01B). Each passage (02) has a length defined by the location of its closed end (02B). The length is also defined by a length of the opposing sidewalls (02E) of the passage (see also FIG. 10A). A width of each passage (02) is also defined by a radius of curvature of the closed end (02B) of the passage, as may be understood with reference also to FIG. 10B. Still further, in use, as detailed elsewhere herein (see e.g. FIG. 6 and accompanying textual passages), a portion of each of the fastener assemblies (03), namely the shaft thereof, is received adjacent to and abuts at least the closed end (02B) of the respective passage. In certain embodiments the shaft of the fastener assembly (03) also abuts at least a portion of the opposing side walls (02E) of each passage (02).

Each passage (02) is also associated with, adjacent its closed end (02B), a recess or recessed portion (102). This may be best understood with reference to FIGS. 1B and 10A-B. As illustrated therein, a depth or height of the wall defined by the closed end (02B) of the passage (02) is less than a depth or height of the two opposing sidewalls (02E) of the passage (02). In this manner, the recess or recessed portion (102) is defined, in part, by the depth or height of the closed end (02B). Specifically, with reference now to FIG. 10A, it may be understood that the recess or recessed portion (102) includes a plurality of side surfaces (02C) and a ledge or shelf (02D). The ledge or shelf (02D) is formed at the intersection of the recess or recessed portion (102) and exists due to the difference in diameters or widths of the recessed portion and the passage (02) with which it is associated, as detailed elsewhere herein.

Figure 10A:
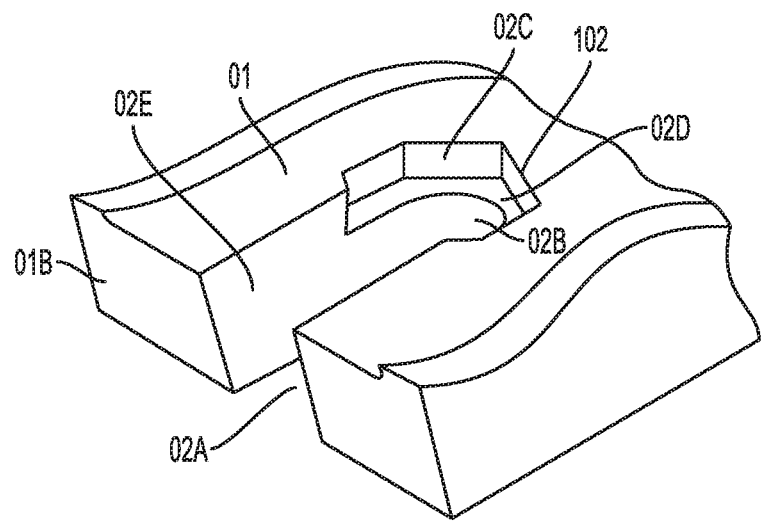
FIG. 10A is a bottom perspective view of a portion of the improved support bracket of FIG. 2, illustrating a close-up of the elongate open-ended passage and the associated recessed portion thereof.

Reference to FIG. 10A further illustrates the recess or recessed portion (102), wherein the plurality of side surfaces (02C) thereof are discretely angled relative to one another so as to define a semi-hexagonal shape of the recess or recessed portion (102). This may also be seen in FIGS. 1B and 10B. In certain embodiments, a height of the plurality of side surfaces (02C) is less than half the height of the two opposing sidewalls (02E) of the passage (02). In another embodiment, the height of the side surfaces (02C) may be approximately half that of the two opposing sidewalls (02E). In yet another embodiment, the height of the side surfaces (02C) is approximately ¼ that of the two opposing sidewalls (02E).

Figure 10B:
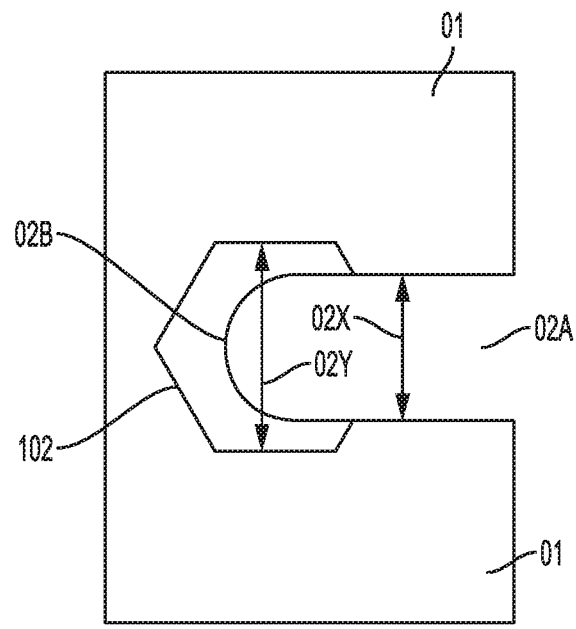
FIG. 10B is a bottom plan view of a portion of the improved support bracket of FIG. 2, illustrating in close-up the elongate open-ended passage and the associated recessed portion thereof.

Turning momentarily to FIG. 10B, it may be understood therefrom that a diameter or width (02X) of the passage (02) at the open end (02A) and along the length thereof to the closed end (02B) (as defined, in part, by the sidewalls (02E)) may be less than a width (illustrated by not numbered) of the opening (01C) and also less than a width (02Y) of the recessed portion (102) adjacent the passage. The width (02Y) of the recess or recessed portion is, in certain embodiments, greater than the width (02X) of the open end (02A) of the passage and also less than the width of the opening (01C). In this manner, the recess or recessed portion (102) is able to receive and securely retain at least one portion of a fastener assembly (03) therein, while each of the passages (02) are elsewhere (including the closed end (02B) and the open end (02A)) differently sized so as to permit passage of the fastener assembly (03) freely therethrough.

The relationship between the fastener assembly (03), the openings (01C), and the elongate open-ended passages (02) may be further understood with reference to FIGS. 6 and 7 when viewed in combination. As illustrated, a fastener assembly (03) is positioned within one of the two elongate open-ended passages (02) and retained relative thereto by engaging a portion of the fastener assembly (03) with the plurality of side surfaces (02C) and the ledge or shelf (02D) of the recessed portion. In at least the illustrated embodiment, the fastener assembly (03) comprises a bolt (03A), a set of nuts (03B), and a washer (03C). As a non-limiting example, the fastener assembly (03) may include a ¾"×3½" bolt (03A), a set of ¾" nuts (03B), and a flat washer (03C)

appropriately sized to correspond with the width of the passage (i.e., being larger than the width—see FIG. 10A—of the passage at its closed end (02B)). Via the configuration described above, flat washers are no longer needed in the fastener assembly (03), as such were typically required/included in conventional configurations.

FIGS. 6 & 7 further illustrate the manner in which the recess or recessed portion (102) adjacent the closed end (02B) of the passage (02) is sized and shaped to at least partly receive and retain therein a head portion of the bolt (03A). In at least the illustrated embodiment, the recess or recessed portion (102) has a semi-hexagonal shape (see also FIGS. 10A-B), corresponding in size and shape to a standard issue hexagonal head of a bolt, such as the bolt (03A). When removal of the support bracket (01) (and thus the tilting bearing (10)) from an associated piece of agricultural equipment is desired, it should be understood that loosening—even just minimally—of the set of nuts (03B) will permit movement of the head of the bolt (03A) downward and out of the recess or recessed portion (102). Translational movement of the fastener assembly (03) thereafter relative to the passage (02)—due at least in part to the size/shape of the associated opening (01C) in the leg portion (01B)—permits complete disengagement of the fastener assembly (03) relative to the support (01), resulting in turn with disengagement of the support (01) and bearing (10) relative to the agricultural equipment. In this manner, a quick and simplistic mechanism is provided for removal/replacement of a worn bearing (10) over time.

It should be understood, with reference FIGS. 10A-B, that the semi-hexagonal shape of the recessed portion (102) (defined largely by the plurality of side surfaces (02C) thereof) should be sized so as to only partly accept and retain—for example—a portion of the associated head of the bolt (03A) of the fastener assembly (03), so as to avoid and prevent vertical passage of the bolt wholly through the closed end (02B). This is achieved due to the presence of the ledge or shelf (02D), defined by the lesser diameter of the passage (02) and thereby providing an abutment that prevents further vertical passage of the head of the bolt through the passage (02). Rotational movement is also prevented upon acceptance of the head of the bolt (03A) within the recessed portion (102), due at least in part to the alignment of the semi-hexagonal shape of the recess with a corresponding semi-hexagonal shape of the head of the bolt (03A). It should be understood, though, that the recess need not be semi-hexagonal in all embodiments; indeed, all that is required is that the shape and size of the recess correspond to the shape and size of the head of a bolt (03A) being utilized.

According to various embodiments, only the recess or recessed portion (102) is semi-hexagonal in shape, with other portions of the passage (02) adjacent thereto—namely the closed end (02B) being shaped and/or sized so as to permit free passage therethrough of portions other than the head of the bolt (03A) (i.e., the shaft of the bolt 03A). In still other embodiments, it should be understood that no semi-hexagonal shape may be provided on the recess or recessed portion (102); all that is required in these and still other embodiments is that the diameter or width of the recess or recessed portion be greater than that of the passage (02) (including the closed end (02B) thereof), such that a portion of the bolt (03A) is prevented from freely passing through an entirety of the passage. In this respect, any of a variety of fastener retention configurations may be envisioned according to the present invention, provided of course that a portion of the fastener assembly (03) is retained securely within the passage (02) and that the passage is an open-ended passage, thereby providing for simplistic and easy movement of the fastener assembly (i.e., the bolt (03A) into and out of the passage, the latter wholly disengaging the fastener assembly relative to the support bracket (01).

Figure 2:
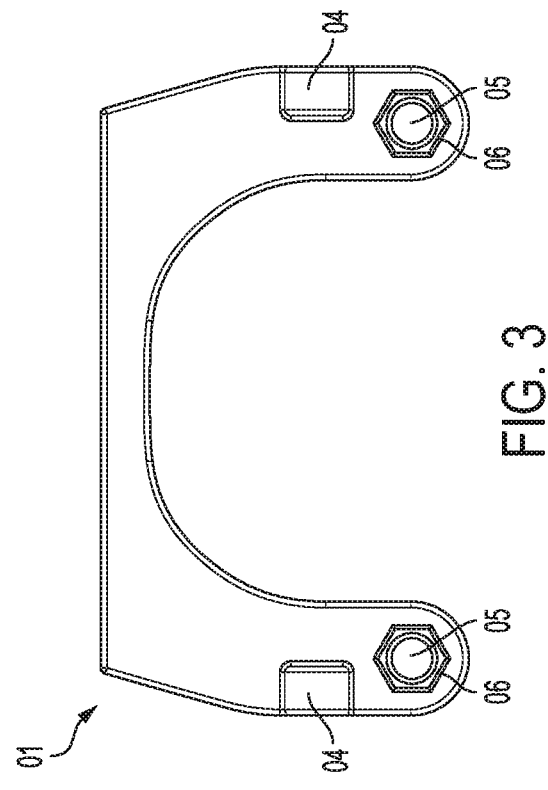
FIG. 2 is a top perspective view of the improved support bracket of FIGS. 1A-1B, illustrated in isolation from the improved tilting bearing of FIG. 1A.
Figure 3:
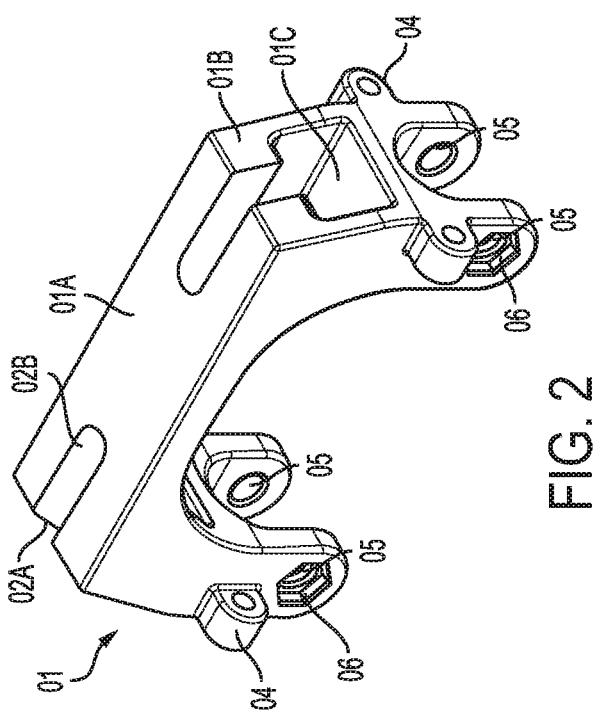
FIG. 3 is a side elevation view of the improved support bracket of FIG. 2 according to various embodiments of the present invention.
Figure 4:
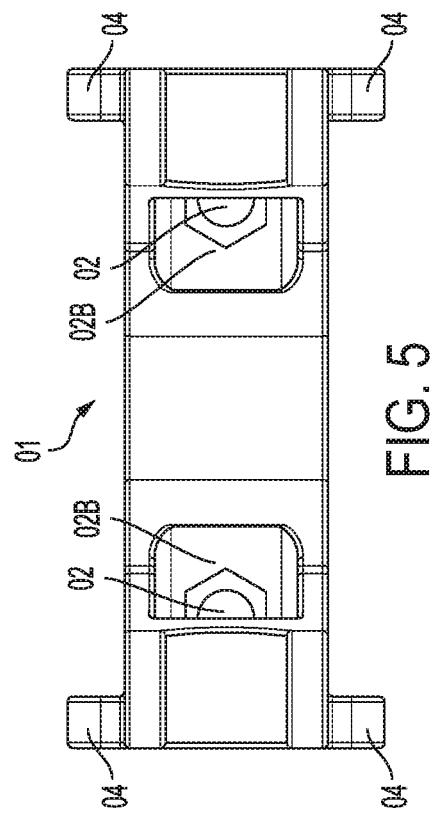
FIG. 4 is a front elevation view of the improved support bracket of FIG. 2 according to various embodiments of the present invention.
Figure 5:
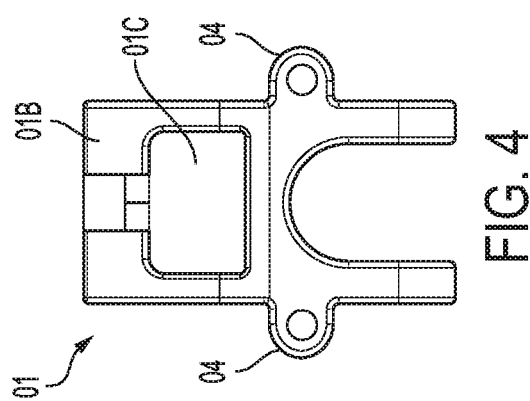
FIG. 5 is a bottom plan view of the improved support bracket of FIG. 2 according to various embodiments of the present invention.
Figure 11:
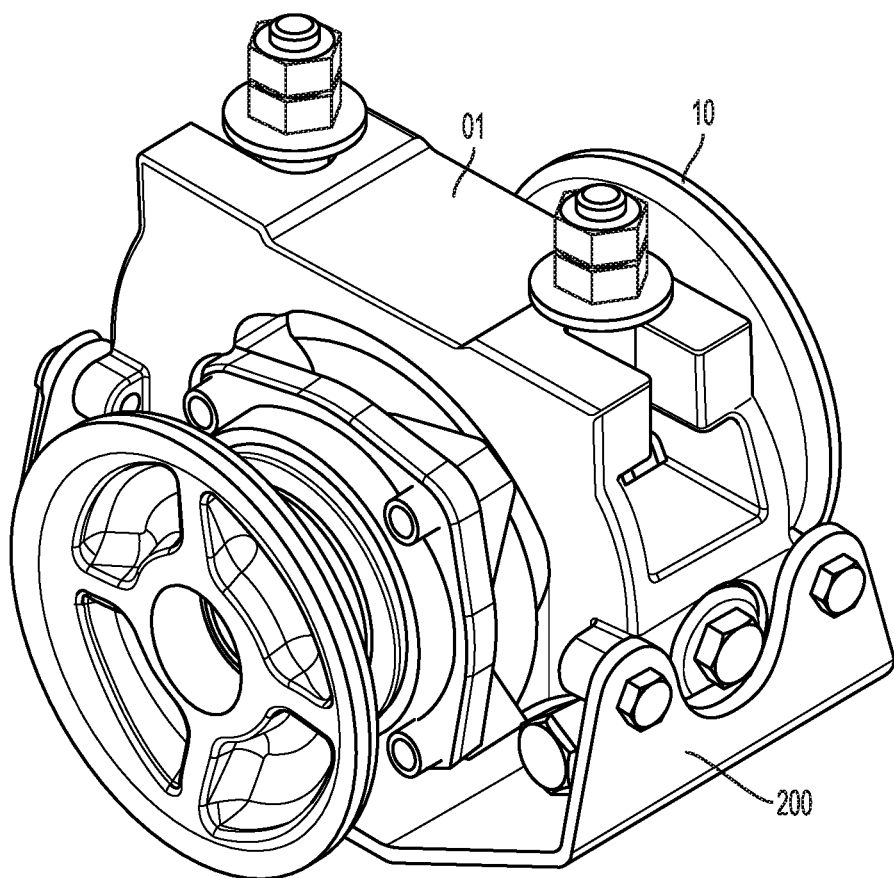
FIG. 11 is a top perspective view of the improved tilting bearing assembly of FIG. 1A, further illustrating attachment of a lower protective covering (200) to the improved support bracket of FIG. 2.

Returning now with reference to FIGS. 2-5, as mentioned the improved support bracket (01) may, according to various embodiments, include a pair of ears (04) along each of its two opposing leg portions (01B). The ears (04) are oriented parallel with a longitudinal axis of the support (01) (see FIG. 2, illustrated but not numbered), foreseeing an arrangement further fastening a lower protective cover (200) (see FIG. 11) to the improved tilting bearing assembly (100). As a non-limiting example, such a lower protective cover (200) would surround a lower portion of the improved tilting bearing (10), opposite the surrounding of an upper portion of the improved tilting bearing by the support bracket (01). In this manner, the improved tilting bearing (10) may be wholly surrounded—at least about its longitudinal axis (see FIGS. 1 and 11 in combination), thereby protecting the bearing from intense wear and/or damage that might occur during use, for example where rocks or debris may fly upward from soil being tilled by the agricultural equipment and hit the bearing directly.

A set of openings (05), each having recesses (06) are also provided at a lower end of each of the two opposing leg portions (01B). As detailed previously herein, these openings (05) (see FIGS. 2 and 3) are sized and shaped to receive and retain therethrough fastener assemblies (07), which in turn retain and secure a portion of the improved tilting bearing (10). In certain embodiments, between the set of openings (05) is provided further a channel (01D), which may in at least one embodiment be substantially U-shaped. This channel (01D) is sized and shaped for receipt therethrough of a respective trunnion (see FIG. 9) of the improved tilting bearing (10), with retention of the trunnion of the bearing (10) being provided via the fastener assemblies (07) passing through the openings (05) and associated recesses (06).

Tilting Bearing

Figure 8:
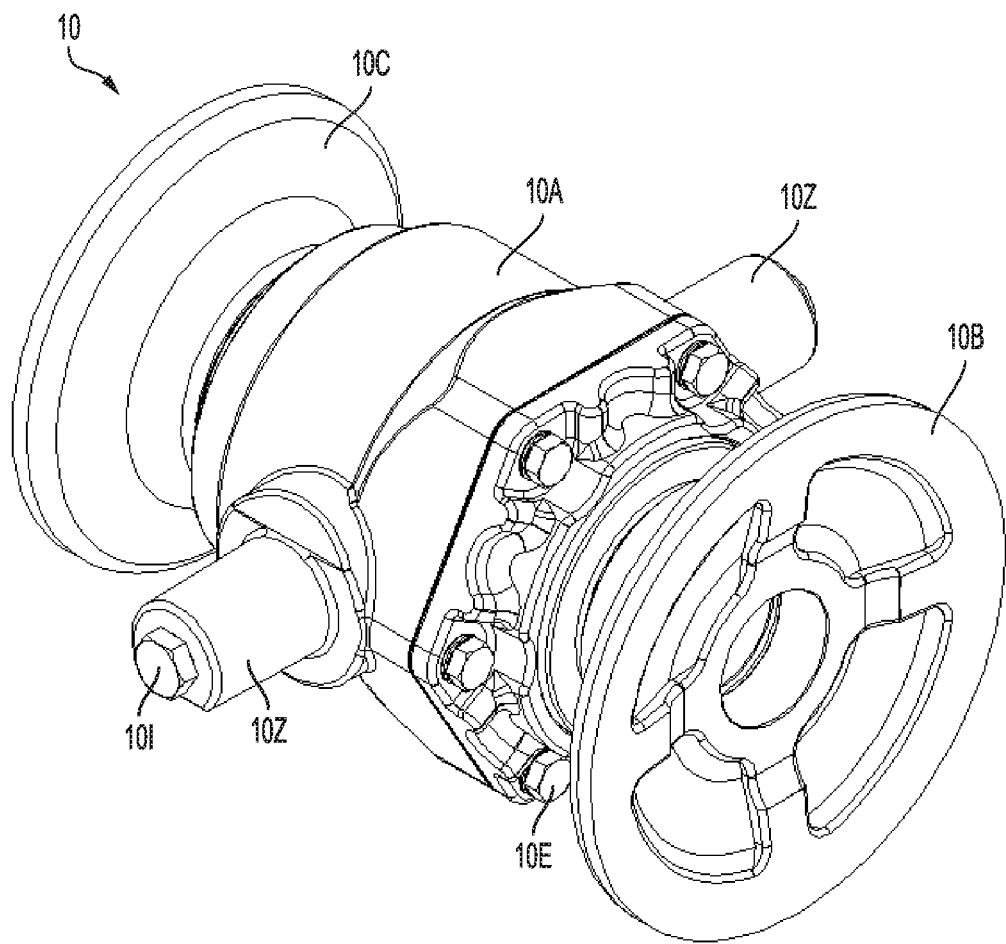
FIG. 8 is a top perspective view of the improved tilting bearing of FIG. 1A, illustrated in isolation from the improved support bracket of FIGS. 1A-B.
Figure 9:
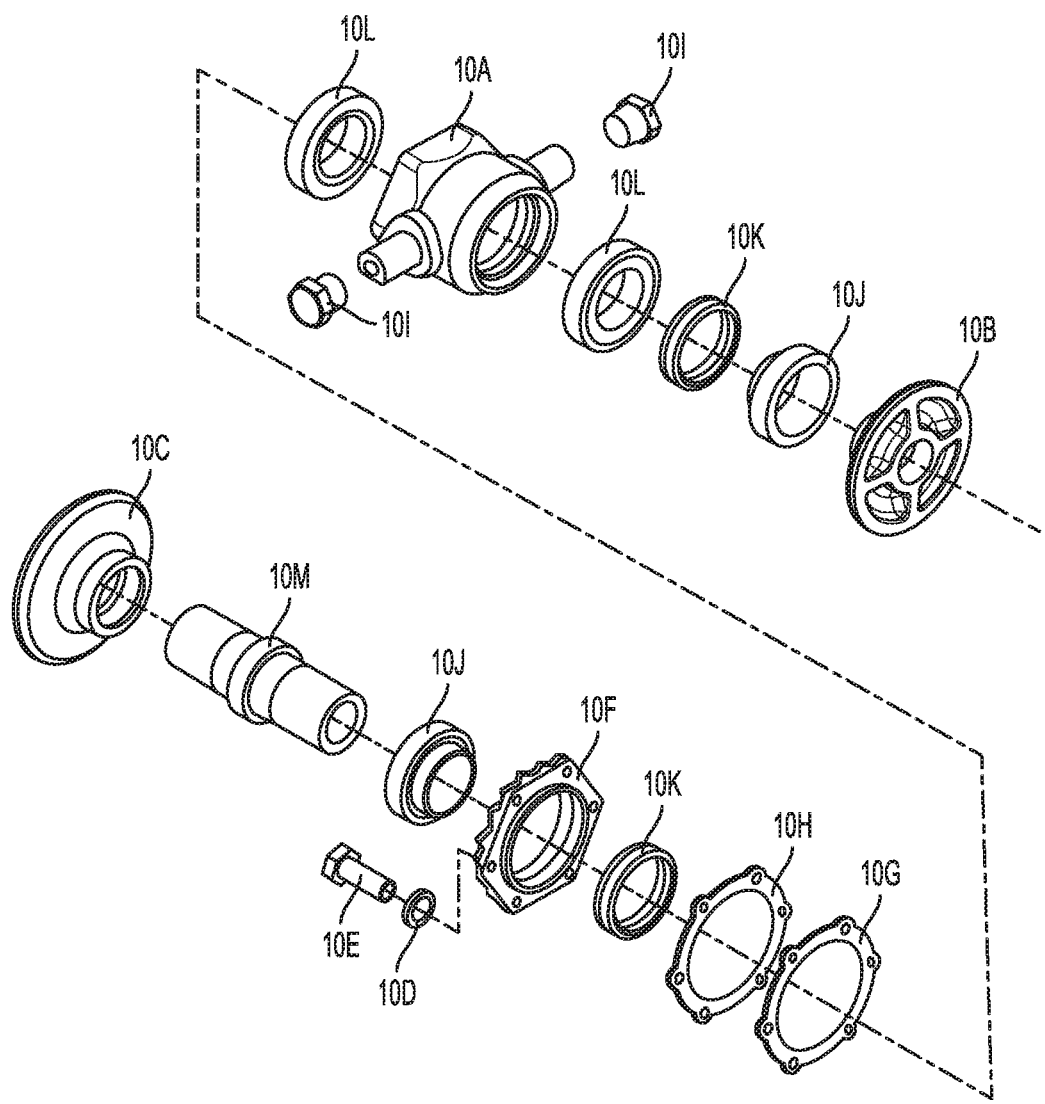
FIG. 9 is an exploded perspective view of a plurality of components of the improved tilting bearing of FIG. 8.

Turning now to FIGS. 8 and 9, illustrated therein is the improved tilting bearing (10) of the improved tilting bearing assembly (100) according to various embodiments of the present invention. FIG. 8 illustrates the bearing (10) in an assembled state, while FIG. 9 illustrates the bearing (10) in an exploded view, so as to facilitate understanding of the distinct and separate components thereof, along with the relative positioning of those components. It should be understood throughout that the bearing (10) of FIGS. 8 and 9 is sized, shaped, and configured for utilization in conjunction with the support bracket (01) described previously herein. That said, within the scope of the present invention, the bearing (10) of FIGS. 8 and 9 may be utilized with supports and/or support brackets other than the bracket (01) described previously herein without departing from the scope and spirit of the present invention, at least relative to the bearing itself.

Visible in FIG. 8 are the primary components, in assembled state, of the improved tilting bearing (10). Of note are the opposing ends of the bearing, namely the inner (10B) and outer (10C) flanges, respectively. Intermediate the flanges (10B, 10C) lies a bearing housing (10A), with a pair of trunnions (10Z) protruding therefrom along an axis perpendicular to an axis defined between the flanges. As detailed elsewhere herein, the trunnions (10Z) are configured to engage and/or operatively connect the improved tilting bearing (10) with the improved support bracket (01), in certain embodiments via a fastening assembly (07) passing through openings (05) framing and at least in part defining a U-shaped channel (01D) (see also FIGS. 1 and 4). A plurality of fastening assemblies (10E) are also illustrated, which are configured to retain various components of the improved tilting bearing (10) relative to one another, in the assembled state. At the outer end of each trunnion (10Z) an oil plug (101) is provided, thereby ensuring secure retention of the lubricant within the bearing (10).

Turning now to FIG. 9 and its exploded view of the components of the improved tilting bearing (10) a plurality of components are visible. These components include, from left to right along the assembly line illustrated (see axis-like dashed line), as follows: an outer flange (10C), an axle (10M), a first seal retainer (10J), a bearing cap (10F) (retained/secured by a fastening assembly (10E) plus a spring washer (10D)), a first face-to-face seal (10K) (e.g., a Duo-Cone seal), two gaskets (10G, 10H), a first tapered roller bearing (10L), a bearing housing (10A) (see also FIG. 8), a second tapered roller bearing (10L), a second face-to-face seal (10K), a second seal retainer (10J), and an inner flange (10B).

Via the inventive concept described herein, the improved bearing assembly (100), which includes the improved tilting bearing (10) of FIGS. 8 and 9, is able to support high loads, keep lubricant properly secured, and also provide a high resilience for the absorption and dissipation of frequent bending moments of axes of disc gangs (or the like) of agricultural equipment to which the bearing assembly (100) may be attached according to various embodiments. This is achieved, at least in part, by using a specific positioning of tapered roller bearings, axial sealing elements for oil lubrication incorporating face-to-face rings (e.g., Duo-Cone seals), and mounting elements (e.g., the support bracket (01) attached to the agricultural equipment (or the like) using trunnions (10Z). As a result of this combination of features, the useful life of the axial seals is increased significantly as compared to conventional configurations; the disc gangs (or the like) also rotate more freely due to the flexibility afforded by the configuration described herein. These advantages have been observed not only in light soil work, but also in lower depth work, where the ground offers more resistance to the action of the discs, resulting in unwanted dragging and thus wear upon various components.

To offset conventional disadvantages in this respect and achieve the advantages described herein, the present invention relies upon a specific relative positioning of at least the tapered roller bearings (10L) and the axial seals (10K). Notably a set of each appears on either side of the bearing housing (10A), with the set of tapered roller bearings (10L) in particular each directly flanking the bearing housing. Adjacent thereto—between the bearing housing (10A) and the inner flange (10B)—is provided one of the two axial seals (10K) or face-to-face rings of the present invention. The other seal (10K) is provided opposite the second of the two tapered roller bearings (10L), relative to the bearing housing. In this manner, a degree of both flexibility (to minimize wear and damage) and rigidity (to ensure sufficient sealing of lubricant) is provided within the improved tilting bearing (10).

Method of Replacing Tilting Bearing

As previously described herein, the improved tilting bearing assembly (100) comprising an improved tilting bearing (10) and an improved support bracket (01) is designed and configured to not only increase protective characteristics of the bearing (10)—including enhanced sealing characteristics and load-absorbing capabilities that result in improved operational performance and greater durability—but to also reduce operational and repositioning costs, which costs are generally incurred when a bearing needs replaced upon an associated piece of agricultural equipment. Reduced operational and repositioning costs are influenced, in the assembly described herein, largely and primarily due to the open-ended nature of the elongate passages (02) formed and provided in the improved support bracket (01). As a result thereof, according to various embodiments, a fastener assembly (03) extending through the passage (02) and thus operatively mounting or affixing the support bracket (01) to a portion of the piece of agricultural equipment may be readily and simplistically removed from the support, which movement in turn disengages the support from the agricultural equipment, notably without requiring complete disassembly of either the fastener assembly itself or the support bracket relative to the bearing.

FIGS. 6 & 7 are particularly informative in this respect and demonstrate how a method of replacing a tilting bearing (10) may be provided via various embodiments of the present invention. As a first step, should replacement or repositioning of the bearing be necessary, the fastener assembly (03) may be minimally loosened, such that at least a head portion of the bolt (03A) of the assembly no longer engages the walls of the recess or recessed portion (102). So disengaged, as for example visible in FIG. 7, the fastener assembly (03)—both of them in fact, each one being in a respective one of the two opposing and symmetric elongate open-ended passages (02) (at least around a midpoint plane of the support bracket)—may be translationally moved out of the passage (02) entirely. Exiting from the passage (02) is enabled not only due to the open end (02A) thereof, but also by the opening or window (01C) defined in the fastener sides or leg portions (01B) (see FIG. 2).

Once the fastener assembly (03) and the support (01) are disengaged from one another, an assembly remains—disengaged also from the agricultural equipment (not shown)—as illustrated in FIG. 1A. Removal/replacement of the bearing (10) may proceed relative to the support bracket (01) by removal of the fastening assembly (07) (see also FIG. 1A). Upon mounting of a new bearing (10) relative to the support bracket (01), reengagement of the support bracket with the agricultural equipment may be achieved simply by sliding or translationally moving the fastener assemblies (03) each back into their respective one of the elongate open-ended passages (02), moving from the open end (02A) toward the closed end (02B). Retention of the fastener assemblies (03) is achieved by inserting at least a head portion of a bolt thereof into the recess or recessed portion (102), such that the hexagonal shape of the head portion is engaged by the semi-hexagonal shape of the recess or recessed portion; a base of the head portion of the bolt may further abut a ledge or shelf defined by the intersection of the recess or recessed portion with the passage, as detailed elsewhere herein.

Where outright replacement of a bearing is not desired, but instead repositioning of the improved assembly (100) may be necessary relative to the agricultural equipment, it should be noted that—upon loosening—the fastener assembly (03) may translate within the open-ended passage (02), thereby permitting minute adjustments, as may be necessary and/or desirable, all while not wholly separating the assembly from the agricultural equipment. In these circumstances, the fastener assembly (03) would disengage the recess or recessed portion (102), but not pass wholly out of the passage (02), either vertically or horizontally. It should be noted that the methods of replacement and/or adjustment described herein are non-limiting and exemplary in nature;

additional and/or alternative procedures may be utilized with the structural components described elsewhere herein.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A tilting bearing assembly comprising:
   a support bracket comprising:
     a substantially planar upper portion lying in a first plane and having two opposing ends and a pair of elongated openings, each elongated opening extending in a first direction entirely through the upper portion of the support bracket and having a closed end and an opposing open end, the closed end of each elongated opening being equidistant from respective ones of the two opposing ends; and
     two opposing leg portions, each of the two opposing leg portions having a length and respective opposing upper and lower ends, the respective upper ends of each of the two opposing leg portions terminating at the first plane, the respective lower ends of each of the two opposing leg portions being free ends spaced apart from the first plane,
       wherein:
         the open end of each of the elongated opening intersects and is defined, in part, by a respective one of the two opposing ends of the upper portion;
         an aperture is defined in each of the leg portions between the lower ends of each of the leg portions and the upper portion of the support bracket;
         at least a portion of the aperture intersects and, in part, defines the open end of a respective one of the pair of elongated openings;
         a pair of holes is defined in each of the respective lower ends of each leg portion; and
         each lower end of each leg portion defines a substantially U-shaped channel that extends intermediate each of the pair of holes; and
   a tilting bearing comprising:
     an inner flange and an opposing outer flange;
     a housing positioned intermediate, along a longitudinal axis of the tilting bearing, the inner and outer flanges;
     a pair of tapered roller bearings flanking, along the longitudinal axis, the housing; and
     a pair of face-to-face seals, each positioned intermediate, along the longitudinal axis, the housing and a respective one of the inner or the outer flange,
       wherein:
         the housing has two opposing trunnions, each extending in a direction perpendicular to the longitudinal axis, and
         at least a portion of each of the two opposing trunnions is received in the substantially U-shaped channel of a respective one of each leg portion of the support bracket.

2. The assembly of claim 1, wherein:
   each of the two opposing leg portions further comprises a pair of ears disposed on opposite sides of the leg portion;
   the pair of ears are spaced a distance apart from the respective lower ends of each leg portion;
   the aperture of each leg portion is positioned intermediate the pair of ears and the upper portion; and
   the assembly further comprises a lower protective cover, the cover being operatively connected to the support bracket via fasteners extending through holes defined in each of the pair of ears.

3. The assembly of claim 1, wherein:
   a recessed portion is defined adjacent the closed end of each of the elongated openings; and
   the recessed portion is semi-hexagonal in shape.

4. The assembly of claim 3, wherein:
   a width of the recessed portion is greater than a width of each of the elongated openings;
   a fastener is positioned in and extends, in the first direction, through each of the pair of elongate openings;
   the fastener comprises a threaded portion having a diameter that substantially corresponds to the width of the elongated openings adjacent the open end; and
   the fastener comprises a head portion having a diameter greater than that of the threaded portion and equal to the width of the recessed portion, such that the head portion is retained within the recessed portion.

5. The assembly of claim 1, wherein:
   each of the two opposing leg portions further comprises a pair of ears disposed on opposite sides of the leg portion;
   the pair of ears are spaced a distance apart from the respective lower ends of each leg portion;
   the aperture of each leg portion is positioned intermediate the pair of ears and the upper portion;
   each of the pair of ears protrude relative to each of the two opposing leg portions in a second direction, the second direction being perpendicular to the first direction in which each elongated opening extends entirely through the upper portion;
   a hole is defined in each ear of the pair of ears, the hole in each ear extend in a third direction, the third direction being perpendicular to both the second and the first direction; and
   the assembly further comprises a lower protective cover, the cover being operatively connected to the support bracket via fasteners extending through the hole defined in each of the pair of ears.

* * * * *